INVENTORS
KENNETH R. FAUX
JOHN V. TITSWORTH
BY Ernest L. Brown
ATTORNEY

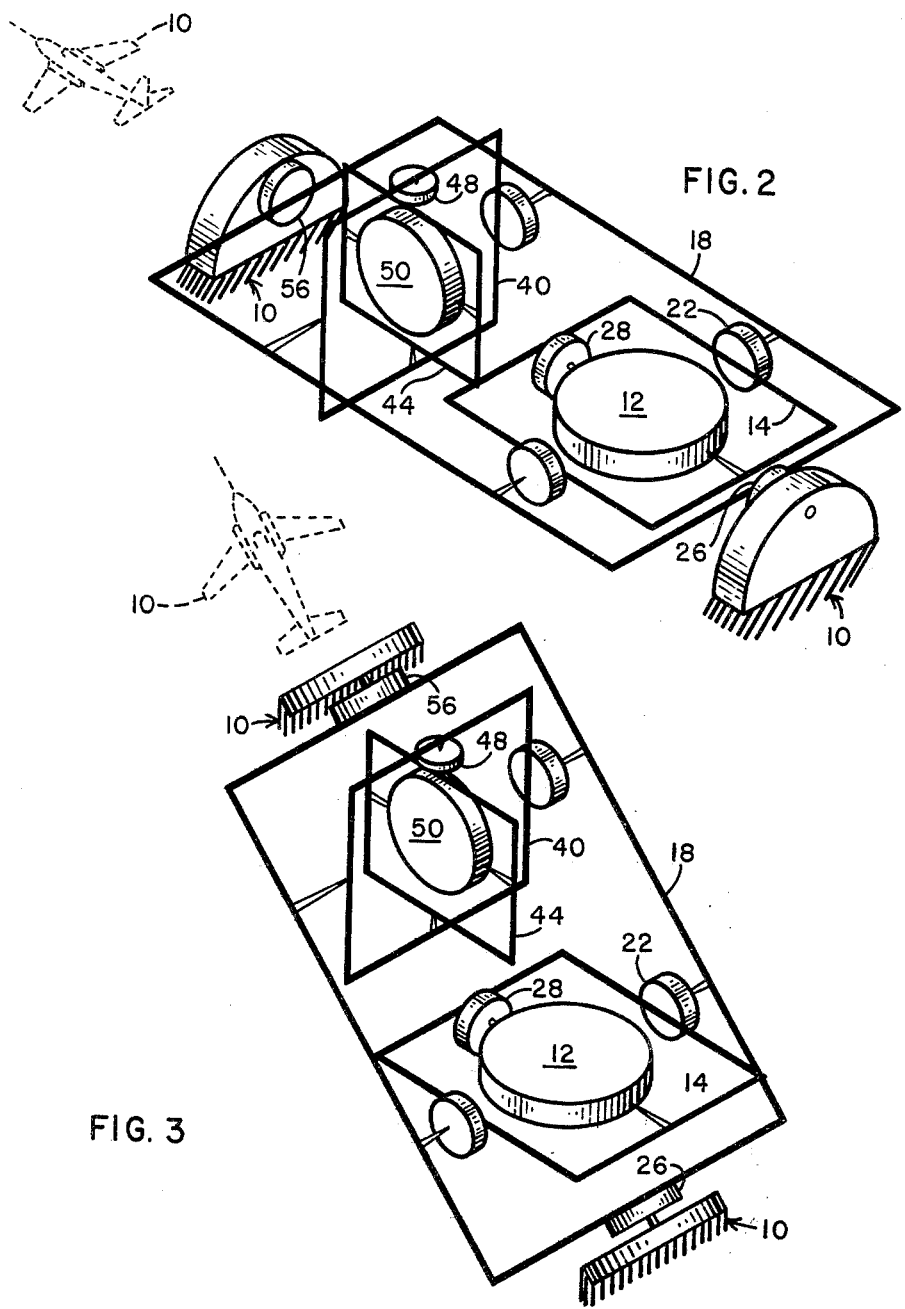

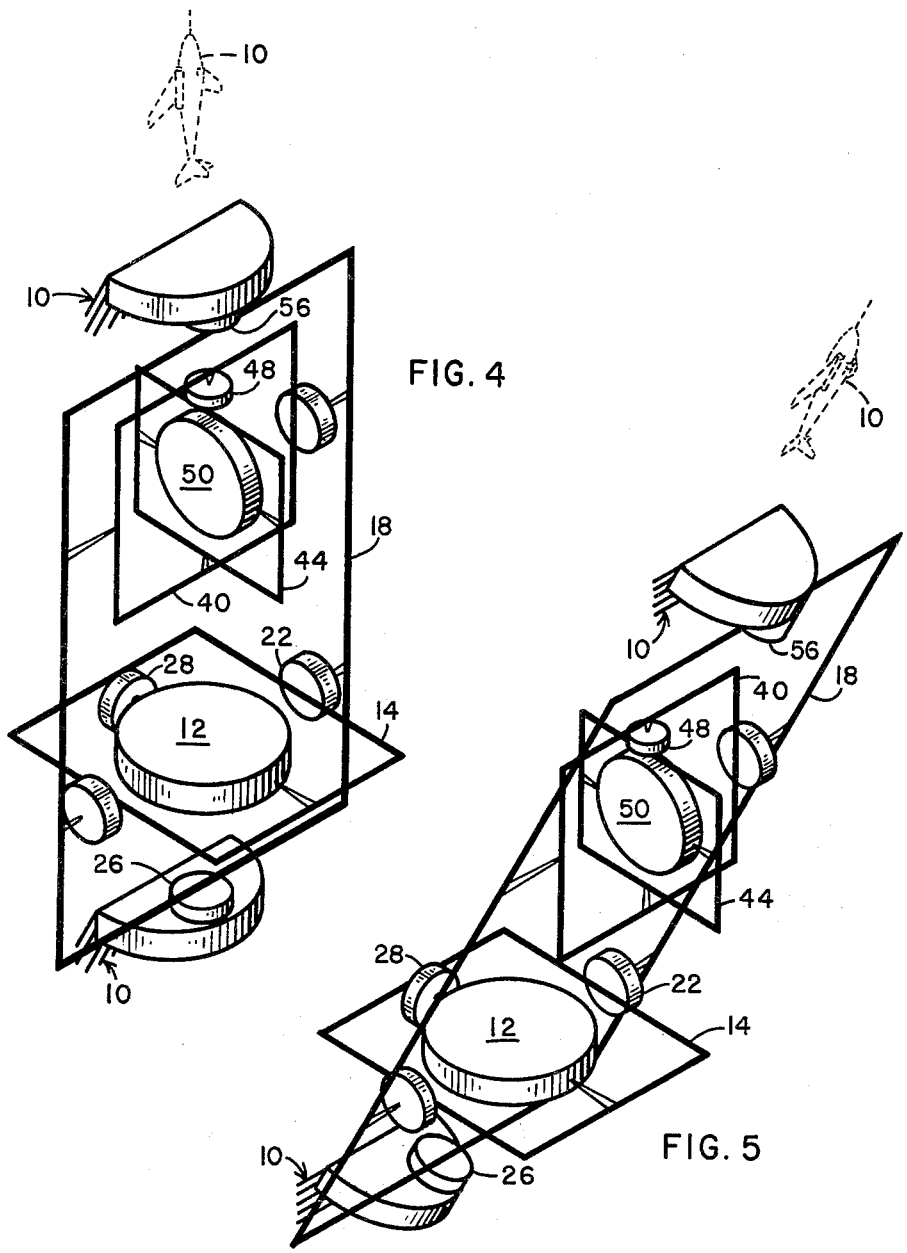

United States Patent Office 3,069,912
Patented Dec. 25, 1962

3,069,912
GIMBAL CONTROLLER
Kenneth R. Faux and John V. Titsworth, Grand Rapids, Mich., assignors, by mesne assignments, to Lear Siegler, Inc., Santa Monica, Calif., a corporation of Delaware
Filed Aug. 10, 1959, Ser. No. 832,792
19 Claims. (Cl. 74—5.34)

This invention pertains to a gimbal controller, and more particularly to a gimbal controller which is adapted to control the outer roll gimbal of a three-axis stabilized platform.

The device of this invention is described in connection with its usual use in an aircraft. However, it is within the contemplation of this invention that other supporting vehicles may be utilized. For example, a rocket type vehicle which operates above the atmosphere may desirably utilize the device of this invention. Further, it is within the conception of this invention that the device may be utilized in undersea craft (such as submarines and other vehicles).

The device of this invention may be utilized in connection with various kinds of three-axis stabilized platforms. The description of the specific structure of this invention, however, is made with reference to a three-axis stabilized platform which is stabilized by a vertical and a directional gyroscope.

It is desirable to initially define the coordinates which are used herein. The vehicle referenced coordinates, which form an orthogonal set, are the roll axis (herein called the outer roll axis), the pitch axis, and the yaw axis. These axes are defined in accordance with the usual aircraft convention. The earth referenced coordinates, which form an orthogonal set, are an azimuth, a horizontal projection of the direction of motion of the vehicle (herein called the inner roll axis), and an elevation axis normal to the azimuth and inner roll axes.

When a three-axis stabilized platform is stabilized by a vertical and a directional gyroscope, it is customary to support both gyroscopes from a common gimbal which is rotatable relative to the supporting vehicle about the roll axis of the supporting vehicle. This common gimbal is frequently called an outer roll gimbal (and it is so described herein), or a redundant gimbal.

In the particular two-gyroscope, three-axis stabilized platform which is described herein, the directional gyroscope has three degrees of angular freedom relative to the outer roll gimbal and the vertical gyroscope has two degrees of angular freedom relative to the outer roll gimbal. Both the gimbal system associated with the vertical gyroscope and the gimbal system associated with the directional gyroscope are mounted for rotation relative to the outer roll gimbal about horizontal axes parallel to the elevation axis, in the plane of the outer roll gimbal and normal to the roll axis of the supporting vehicle. The outer roll gimbal is connected to be selectively rotated about the roll axis of the supporting vehicle to maintain the orientation of these last mentioned axes. It is to be stressed that although the invention herein is described in connection with a two-gyroscope platform with a particular gimbal configuration, that the device of this invention is not limited to that particular platform or configuration.

In the gimbal system associated with the vertical gyroscope, the shaft which supports the frame of the vertical gyroscope is maintained locally horizontal and parallel to the horizontal component of the direction of motion of the supporting vehicle. The axis of this shaft is called the inner roll axis of the stabilized platform.

The outer roll gimbal is preferably controlled so that the plane of the gimbal is inclined relative to a horizontal plane through an angle which is equal to the elevation angle of the supporting vehicle.

The gimbal system of the directional gyroscope supports the directional gyroscope so that the spin axis thereof is maintained locally horizontal. Suitable pickoffs are connected to the gimbal system of the directional gyroscope to detect a signal which is a measure of the azimuth angle of the supporting vehicle.

It is desirable to have a true indication of elevation angle through 360° of vehicle pitch maneuver. To accomplish this, the outer roll gimbal ordinarily (prior to this invention) must be rotated 180° when the supporting vehicle is tilted vertically upward or downward.

The device contemplated by this invention performs the necessary function to stabilize the outer roll gimbal of a three-axis reference device so that it need not rotate 180° about its axis as the supporting vehicle tilts through the vertical position.

Ordinarily (prior to this invention) when the supporting vehicle rolls, the angle of roll (or a function thereof) is detected as angular motion between the case of the vertical gyroscope and its next adjacent gimbal about the inner roll axis. The signal generated about the inner roll axis (called an inner roll signal) is amplified and is utilized to drive a motor to rotate the outer roll gimbal about its axis. The rotation of the outer roll gimbal causes the angle between the direction of the spin axis of the vertical gyroscope and the plane of the outer roll gimbal to be a measure of the elevation angle of the supporting vehicle. The angle through which the outer roll gimbal is unrolled relative to the supporting vehicle is a measure of the roll angle of the supporting vehicle about its roll axis.

In level flight, the inner roll signal which is a measure of a horizontal component of the roll of the supporting vehicle is a measure of true aircraft roll. In vertical flight, however, a roll of the aircraft about its own roll axis does not produce a rotation about the inner roll axis since the roll axis of the aircraft is now parallel with the spin axis of the vertical gyroscope. Since a synchro attached to the inner roll axis produces no control signal to control the outer roll gimbal, relative to aircraft roll, when the supporting aircraft is in locally vertical flight, a pickoff attached to the azimuth axis on the directional gyroscope is used in accordance with this invention to control the outer roll gimbal. It is readily apparent that the roll of the supporting vehicle in vertical flight represents a change in azimuth. Since the directional gyroscope provides a heading or azimuth reference, the azimuth signal may be utilized to control the outer roll gimbal.

Two extremes (level flight and vertical flight) have been mentioned. To control the redundant or outer roll gimbal between these extremes, the device of this invention controls the outer roll gimbal from a combination which is a function of the elevation angle of the supporting vehicle. The sensitivity of a synchro on the inner roll axis decreases as a cosine function of the elevation angle of the supporting vehicle. By providing an amplifier with a high gain, the outer roll gimbal can be accurately controlled by the inner roll signal for relatively high elevation angles. It is usually, therefore, not necessary to initiate a combination inner roll-azimuth control (in accordance with this invention) at elevation angles of less than (for example) 70°. The device of this invention is connected to control the outer roll gimbal by generating a signal which is proportional to the azimuth angle times the sine of the elevation angle plus the inner roll angle times the cosine of the elevation angle. The combined signals are connected to drive an amplifier to control or stabilize the outer roll gimbal when the supporting vehicle is tilted upward or downward at a high elevation.

In a typical installation, switches are connected to be driven by an elevation angle servo to automatically initiate or release the controller of this invention at elevation angles of 70°, 110°, 250° and 290°.

An azimuth servo whose control transformer rotor is locked when the gimbal controller of this invention is engaged generates an azimuth to be utilized in the controller of this invention. The azimuth signal so generated is a measure of the azimuth angle increment from the time the controller is engaged.

Provision may optionally be made to allow the pilot to manually connect the controller of this invention when the elevation angle is at any desired value.

When the controller of this invention is utilized, a control is preferably provided to automatically disconnect the controller of this invention if the inner roll signal exceeds a predetermined maximum amount. The automatic disconnect is utilized to prevent the spin axis of the vertical gyroscope from aligning with the pitch axis of the vehicle which would cause the vertical gyroscope to tumble.

It is to be noted that although mechanical switches (both segment switches and relays) are described herein that equivalent electronic switching devices (such as tubes or transistors, for example) could be utilized. It is further within the contemplation of this invention that magnetic switching devices (such as saturable reactors and the like) could be utilized as switching devices.

It is, therefore, an object of this invention to provide a novel gimbal controller.

It is another object of this invention to provide a gimbal controller for a three-axis stabilized platform.

It is still another object of this invention to provide a gimbal controller adapted to control an outer roll gimbal of a three-axis stabilized reference device to give continuous, accurate readings of roll, elevation, and azimuth angles at all attitudes of the supporting vehicle.

It is another object of this invention to provide a novel gimbal controller adapted to control the outer roll gimbal of a three-axis reference device supported with a vehicle.

It is a more specific object of this invention to provide means for controlling the outer roll gimbal of a three-axis stabilized reference device to stabilize said gimbal at all pitch, roll, and azimuth attitudes of the supporting vehicle.

It is also a more specific object of this invention to provide means for controlling the outer roll gimbal of a three-axis reference device in accordance with a combination of inner roll and azimuth signals combined as a function of the elevation angle of the supporting aircraft.

Other objects will become apparent from the following description when taken in connection with the accompanying drawings in which:

FIG. 2 is a stick diagram of a controlled three-axis reference device utilized with this invention, with the supporting vehicle level;

FIG. 3 is a stick diagram of a controlled three-axis reference device utilized with this invention, with the supporting vehicle tilted upward;

FIG. 4 is a stick diagram of a typical controlled three-axis reference device utilized with this invention with the supporting vehicle flying vertically upward;

FIG. 5 is a stick diagram of a typical controlled three-axis reference device utilized with this invention, with the supporting vehicle tilted beyond the vertical into a loop maneuver.

Figure 1:
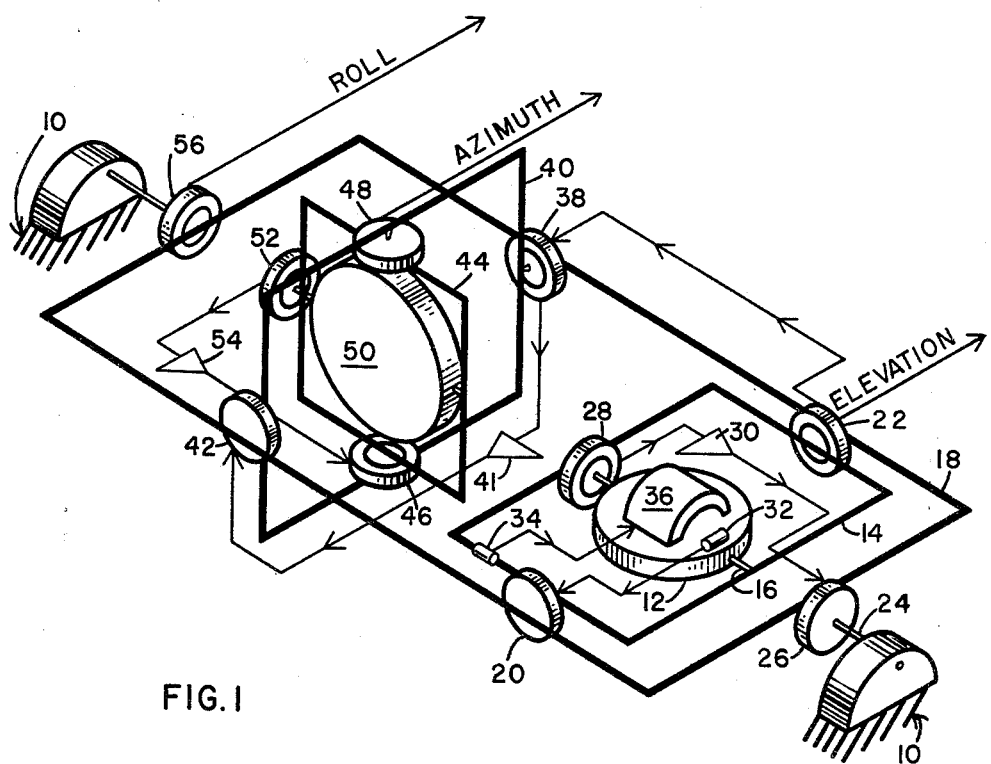
FIG. 1 is a stick diagram, partially in schematic, of a typical two-gyroscope, three-axis stabilized reference device which is adapted to be utilized with this invention.

FIGS. 1 through 5 are stick diagrams showing the gimbal system and gyroscope orientation of a typical two-gyroscope reference device. In FIG. 1, additional structure has been supplied to better describe the manner in which the two-gyroscope reference device is stabilized. FIGS. 2 through 5 have been shown to set forth the relative orientation between the axes of the directional and vertical gyroscope and the axes of the supporting aircraft during flight maneuvers.

In FIG. 1, the supporting aircraft 10 is shown by the ground marks. Vertical gyroscope 12 is mounted for rotational freedom relative to gimbal 14 about inner roll axis 16. Gimbal 14 is mounted for rotation relative to outer roll gimbal 18 about the elevation axis which passes through the centers of torquing device 20 and pickoff device 22. Gimbal 18 is mounted for rotation about an outer roll axis 24 relative to the supporting vehicle 10. A torquing device 26 is positioned between aircraft 10 and gimbal 18 to turn gimbal 18 controllably relative to aircraft 10. A pickoff device 28 is mounted to detect relative rotation between vertical gyroscope 12 and gimbal 14 about the inner roll axis. The electrical output of angular displacement detecting device 28 is usually (prior to this invention) connected through a suitable amplifier 30 to control torquing device 26 to cause gimbal 18 to follow a controlled maneuver relative to the angular displacement between vertical gyroscope 12 and gimbal 14. A pair of gravity detecting devices, such as (for example) electrolytic switches 32 and 34, are positioned on gyroscope 12 and gimbal 14, respectively, to detect deviation between the spin axis of vertical gyroscope 12 and the vertical measured by the electrolytic switches. The output of electrolytic switch 32 is electrically connected to control torque motor 20. The electrical output of electrolytic switch 34 is connected to torquing means 36 to supply a torque about the inner roll axis to gyroscope 12.

The electrical output of angular pickoff 22 is a measure of the elevation angle of vehicle 10. The output of pickoff 22 is connected to a comparison device 38, such as (for example) a synchro transformer to generate an error signal whenever gimbal 40 is misaligned compared to a desired alignment relative to the vertical direction defined by the axis of vertical gyroscope 12. The error signal from comparison device 38 is electrically connected through amplifier 41 to torquing device 42 to turn gimbal 40 about an axis, parallel to the elevation axis, which runs through the center of device 38 and of torque motor 42. Thus, gimbal 40 is supported to be stabilized against angular rotation of its case about the elevation axis by being electrically slaved to the vertical direction defined by the spin axis of vertical gyroscope 12.

Gimbal 44 is connected for rotation about an azimuth axis relative to gimbal 40. Torquing device 46 is connected to apply torques about the azimuth axis between gimbals 40 and 44. Pickoff device, such as (for example) a synchro 48, is connected between the gimbals 40 and 44 to generate a signal which is a measure of the azimuth angle of vehicle 10.

Directional gyroscope 50 is supported about a horizontal or leveling axis relative to gimbal 44. The angular displacement of the axis of rotation of directional gyroscope 50 about its leveling axis relative to gimbal 44 is detected by pickoff device 52. The electrical output of pickoff device 52 is connected through amplifier 54 to torquing device 46.

It is to be noted that the horizontal orientation of the spin axis of directional gyroscope 50 is not necessarily in the direction as shown in FIGS. 1 through 5, but may be in any predefined direction. It is to be further noted that the spin axis of the directional gyroscope 50 has been servoed into a horizontal plane.

A pickoff device, such as (for example) a synchro 56, is connected between gimbal 18 and the supporting aircraft 10 to generate an electrical signal which is a measure of the roll angle of the supporting vehicle 10.

FIGS. 2, 3, 4 and 5 are presented to show the relative displacements of the three-axis reference device of this invention at various elevation angles of the supporting aircraft 10. In FIG. 2, the supporting aircraft is flying level. In FIG. 3, the supporting aircraft has tilted up at an angle of (for example) 60°. In FIG. 4, the supporting aircraft 10 is flying vertically upward. In FIG. 5, the supporting aircraft has tilted over into the second quadrant. It is to be noted that the orientation of the spin axes of the vertical gyroscope 12 and of the directional gyroscope 50 have not changed.

Figure 6:
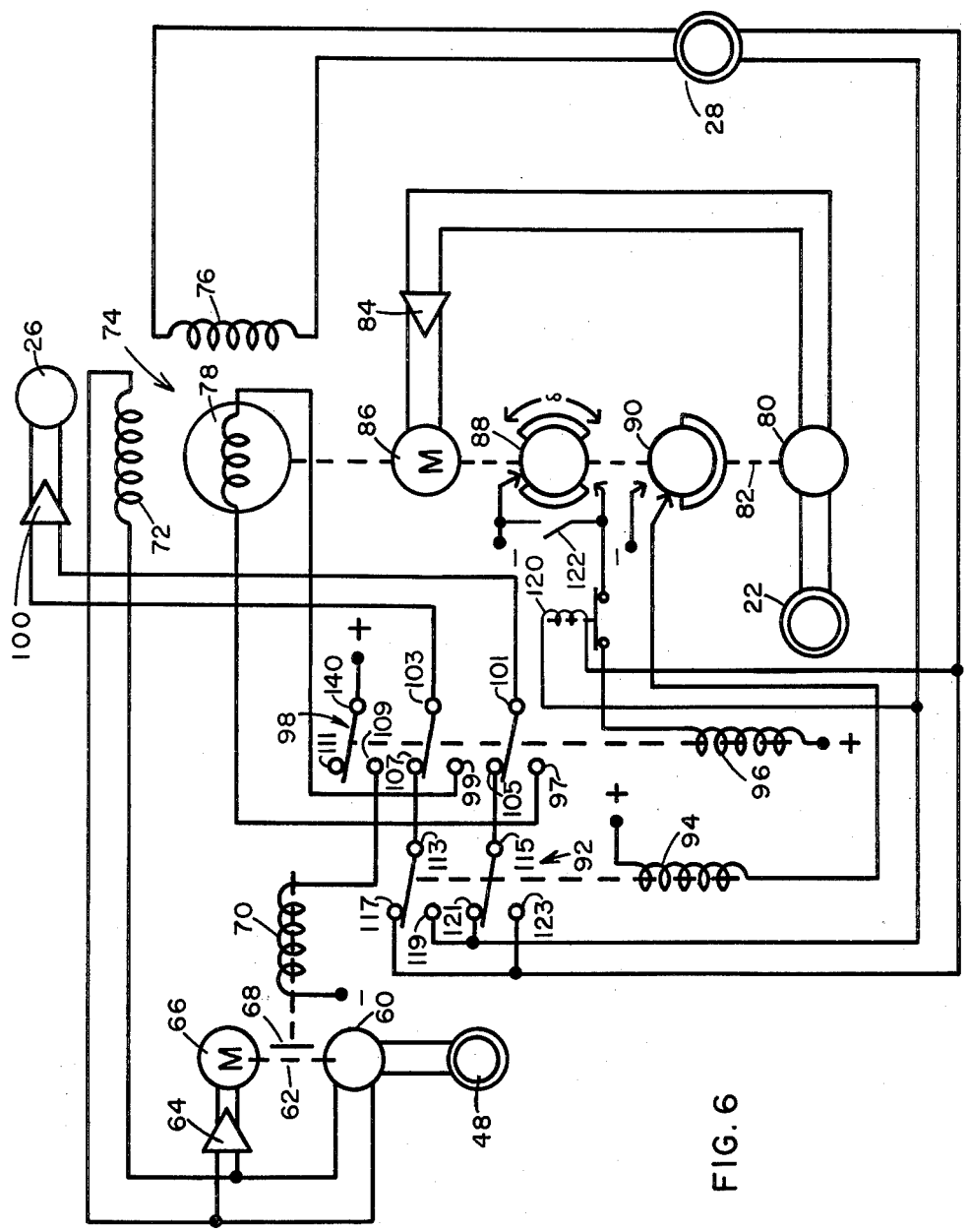
FIG. 6 is a schematic diagram of a typical gimbal controller utilized in this invention.

In the gimbal controller of FIG. 6, azimuth synchro 48 is connected to a comparison transformer 60 whose shaft position depends upon the position of shaft 62. The electrical output of transformer 60 is connected through amplifier 64 to drive motor 66 which, in turn, drives shaft 62. Synchro 48, transformer 60, amplifier 64 and motor 66, therefore, form a loop synchro which is adapted to position shaft 62 in accordance with a command signal from azimuth pickoff 48. Hence, it follows that the position of shaft 62 depends upon the azimuth angle of the aircraft relative to some predetermined reference azimuth. A brake 68 is connected to shaft 62 whenever relay 70 is energized to temporarily prevent shaft 62 from turning. The electrical output of transformer 60 is connected to winding 72 of resolver 74. Note that when brake 68 is not engaged, the signal applied to winding 72 is very small and, in fact, insignificant. When, however, brake 68 is engaged, the signal applied to winding 72 is a measure of the increment of azimuth angle which has accrued since brake 68 is applied.

Synchro 22 generates a signal which is a measure of the elevation angle of the supporting vehicle 10. The electrical output of synchro 22 is connected to transformer 80 which is driven by shaft 82. The electrical output of transformer 80 is an error signal which is connected through amplifier 84 to drive motor 86 which, in turn, drives shaft 82. Hence, synchro 22, transformer 80, amplifier 84 and motor 86 form a closed loop servo to position shaft 82 in response to the elevation angle of the supporting vehicle 10. Shaft 82 is mechanically connected to drive the rotor 78 of resolver 74 and to drive the rotors of segment switches 88 and 90. The position of the rotor 78 and the rotors of segment switches 88 and 90, therefore, depend upon the pitch angle of the supporting vehicle 10.

Inner roll synchro 28 generates a signal which is a measure of the angle between gimbal 14 and the spin axis of vertical gyroscope 12. The electrical output of synchro 28 is connected to winding 76 of resolver 74 and to the stator terminals 117, 119, 121, 123 of reversing relay 92. Relay 92 is energized when coil 94 is energized to reverse the polarity at the armature terminals 113, 115 of relay 92. An additional pair of armatures (not shown) is frequently connected to relay 92 to reverse the polarity of the heading signal to a heading repeater. Synchro or pickoff 28 is also connected to energize relay 120 when the signal of synchro 28 reaches a predetermined magnitude. Alternative circuiting (not shown) may be connected between pickoff 28 and relay 120 to more accurately control relay 120.

Switch 88 is segmented to be closed when the pitch angle of the aircraft approaches 90° or 270°. The angle δ is a predetermined value. A typical value of δ (for example) is of the order of 40° which causes switch 88 to close between the angles of 70° and 110° and between the angles of 250° and 290°. Such segment switches are frequently designated "high angle" switches because the aircraft is flying almost vertically upward or downward. When switch 88 is closed, coil 96 is energized which causes the armatures of relay 98 to move into their arm downward position.

Brake coil 70 is connected to be energized through terminals 109 and 140 when relay 98 moves into its arm downward position.

In the arm upward position of relay 98, two of the armatures 101 and 103 thereof are adapted to be connected through terminals 105 and 107 to the armatures 115 and 113 of relay 92. In the arm downward position, the same two armatures 101 and 103 of relay 98 are connected through terminals 97 and 99 to rotor 78 of resolver 74. Two of the armatures 101 and 103 of relay 98 are connected through amplifier 100 to deliver a usable output signal to torquer 26 on outer roll gimbal 18.

In operation of the three-axis reference device of FIG. 1, the roll axis of the supporting aircraft is parallel to the axis of shaft 24 which supports outer roll gimbal 18. As the vertical gyroscope 12 is caused to have its spin axis other than vertical, pendulous devices such as (for example) electrolytic switches 32 and 34 detect the deviations between the switch sensed vertical and the direction of the spin axis of gyroscope 12 to generate an electrical signal to cause torquers 20 and 36 to apply torques to gyroscope 12 and gimbal 14 which causes the spin axis of gyroscope 12 to be erected into a vertical orientation. Hence, as the aircraft tilts up or down, the plane of gimbal 14 is maintained locally horizontal while the plane of gimbal 18 inclines up or down with the elevation angle of the supporting vehicle. The angle between these two planes, measured by pickoff device 22, is the elevation angle of the supporting vehicle.

Pickoff device 28 measures the inner roll angle between the spin axis of gyroscope 12 and the plane of gimbal 14. A customary connection is shown in FIG. 1 wherein a signal which is a measure of the deviation from a right angle of the angle between the spin axis of gyroscope 12 and the plane of gimbal 14 is generated by pickoff 28, is amplified by amplifier 30, and is applied to torquer 26 to unwind gimbal 18 to thereby stabilize the plane of gimbal 14 at low elevation angles.

When the supporting aircraft 10 reaches a predetermined high elevation angle, it is desirable to change the control signal applied to follow-up torquer 26, in accordance with this invention, to cause the signal from pickoff 56 to be a measure of the roll angle of supporting vehicle 10.

In horizontal flight (as shown in FIG. 2) pickoff 28 senses signals which represent true aircraft roll. The signals from synchro 28 then could be used to control torquer 26 directly to turn gimbal 18 in proportion to the roll of the supporting vehicle, which then relevels both gimbal 18 and gimbal 14. As the vehicle pitches up (as shown in FIG. 3), the sensitivity of the inner roll synchro 28 to aircraft roll decreases as a cosine function of the elevation angle measured by pickoff or synchro 22. Thus when the vehicle 10 is tilted upward (as shown in FIG. 3) or is tilted over (as shown in FIG. 5) a roll of the aircraft 10 causes a signal to appear at pickoff 28 which is proportional to an angle that is less than the true angle of roll of the supporting vehicle 10. A signal is sent to torquer 26 to rezero the signal from synchro 28. As the tilt of the aircraft becomes more vertical, either up or down, the pickoff synchro 28 then becomes less sensitive to roll of the supporting vehicle. When the aircraft is flying vertically upward or downward, it is flying parallel to the spin axis of vertical gyroscope 12 so that roll of vehicle 10 is not detected by inner roll pickoff 28. It is evident, however, that roll of vehicle 10 is now detected by azimuth pickoff 48. The third gimbal controller or redundant gimbal controller of this device is designed to drive gimbal 18 to give the pilot a continuous elevation, roll and azimuth indication of his vehicle. To this end, at high pitch angles (that is angles near 90° and 270°) provision is made, by the device of this invention, to control the outer roll gimbal by the sum of a fraction of the signal from synchro 28 plus a second fraction of the signal from synchro 48, said fractions being a function of the elevation angle and being connected to be controlled by signals from pitch synchro 28. Between the extremes of level flight and vertical flight, the gimbal controller of this invention controls the outer roll gimbal in response to combinations of signals from the inner roll synchro 28 and the azimuth synchro 48. The particular combination is controlled by the signal from synchro 22.

Referring now to FIG. 6, an elevation angle servo shown by synchro transformer 80, amplifier 84 and motor 86, drives shaft 82 and resolver 78 in response to the output signal of synchro 22. This causes the shaft position of shaft 82 and rotor 78 of resolver 74 to be proportional to the elevation angle of the supporting vehicle 10. The input signals of resolver 74 are inner roll signals connected to stator 76 and incremental azimuth signals connected to stator 72. The output signal taken from rotor 78 is proportional to an incremental azimuth angle multiplied by the sine of the elevational angle plus the inner roll angle multiplied by the cosine of the elevation angle. The output of resolver 74 is connected to terminals 97 and 99 which energize armatures 101 and 103 when relay 98 is actuated into its arm downward position.

Since the sensitivity to roll of the aircraft of the inner roll pickoff 28 decreases as a cosine function of the elevation angle, the output of synchro 28 may be utilized directly to control torquer 26 for relatively high elevation angles with accurate control of the third gimbal 18 if high enough gain is provided by the third gimbal amplifier 100 of FIG. 6 or 30 of FIG. 1.

In a typical device, it was found not to be necessary to initiate control of gimbal 18 by a combination of roll-azimuth signals at elevation angles of less than 70° (but this invention is not limited to these values). Switch 88 was, therefore, adjusted to cause torquer 26 to be controlled by signals from rotor 78 when the elevation angle was between the high angles of 70° and 110° and between the high angles of 250° and 290°.

In that typical device, then, relay 98 was in its arm upward position when the elevation angle was between plus 70° and minus 70° and between 110° and 250°. With relay 98 in its arm upward or de-energized position, controlling signals are transferred from inner roll pickoff 28 through relay 92 and relay 98 to amplifier 100 and outer roll torquer 26.

When the elevation angle is in the second or third quadrants, coil 94 is energized by segment switch 90 to cause relay 92 to move to its arm downward position. Movement of relay 92 to its arm downward position reverses the sense of the voltage applied from relay 92 through relay 98 to amplifier 100. This automatically takes care of the reverse in polarity of the voltage of inner roll synchro 28 when aircraft 10 passes through its vertical position. For example, in FIG. 5, a clockwise roll of aircraft 10 would, without voltage reversed, cause a counter-clockwise roll of gimbal 14 relative to gyroscope 12. The polarity reversed is necessary to transfer a stable followup signal to amplifier 100. In a similar fashion, the azimuth signal to an azimuth indicator (not shown) could conveniently be reversed in polarity by relay 92.

When relay 98 is energized at high pitch angles, the armatures thereof move to their arm downward position. The armatures 101 and 103 of relay 98 are connected to the rotor 78 of resolver 74 to control torque motor 26 in accordance with combinations of inner roll and azimuth signals.

When relay 98 is energized, winding 70 is energized to cause brake 68 to stop the motion of shaft 62. From that moment on, the output of transformer 60 reflects increments in azimuth from the value of azimuth which existed immediately prior to the engagement of brake 68. It is to be noted that these increments in azimuth are approximately proportional to the increments of roll angle of aircraft 10 at high elevation angles and, in fact, when the aircraft is flying vertically, they are exactly equal to the change in roll angle. Hence, the signals applied to winding 72 represent a change in azimuth angle from the time when relay 98 moved into its arm downward position.

When the controller of this invention is engaged, it is possible that certain maneuvers of the supporting vehicle would cause the angle between the spin axis of vertical gyroscope 12 and the plane of gimbal 14 to depart substantially from a right angle. For example, consider a vehicle whose elevation angle is substantially 90°, as shown in FIG. 4. In FIG. 4, the yaw axis of the supporting vehicle is substantially parallel with the inner roll axis upon which the frame of vertical gyroscope 12 is supported. If the supporting vehicle were to yaw, or turn about its yaw axis, the plane of gimbal 14 would be forced to turn about the inner roll axis relative to the spin axis of gyroscope 12. When the plane of gimbal 14 turns relative to gyroscope 12, an inner roll signal is generated by synchro 28. When the angle between the spin axis of gyroscope 12 and the plane of gimbal 14 departs from a right angle by a predetermined amount, the signal from synchro 28 reaches a magnitude which causes relay 120 to open when the signal applied thereto is (for example) twenty degrees. When relay 120 opens, outer roll gimbal 18 is again controlled only by signals from synchro 28, which are now appreciable. Gimbal 18 is slewed into position to return the plane of gimbal 14 to horizontal.

For some maneuvers it is desirable to use the third gimbal controller when the supporting vehicle has a low pitch angle. Switch 122 can be manually closed to engage the controller of this invention at any time.

For example, during a toss bombing maneuver as the aircraft starts to tilt upward from the horizontal, switch 122 can be manually closed which connects rotor 78 to torquer 26 and engages brake 68 as described above. As the toss bomb maneuver continues, if the azimuth of the supporting vehicle changes, the signal applied to stator 72 changes. A portion of the signal on stator 72 causes a torque to be applied by torquer 26 which rolls gimbal 18. The rolling of gimbal 18 causes a roll indication to be set from synchro 56 to the pilot's indicator (not shown). The pilot rolls his plane to correct for what he thinks is a roll, which automatically corrects the azimuth of the plane to return it to its original course.

Thus the device of this invention provides both a means for continuously generating signals which are a measure of pitch, azimuth, and roll angles and a means for maintaining an aircraft on a predetermined azimuth heading.

Although the device of this invention has been described in detail, it is not intended that the invention should be limited by the above description but only in accordance with the spirit and scope of the appended claims.

We claim:
1. In combination: a stabilized platform positioned upon a supporting vehicle for three degrees of angular freedom and including an outer roll gimbal having torquing means attached thereto; at least means attached to said stabilized platform for generating signals proportional to the elevation angle, azimuth angle, and inner roll angle; resolver means connected to generate a signal proportional to the azimuth angle times the sine of the elevation angle plus the inner roll angle times the cosine of the elevation angle; first servo means, including a controllable brake and a first shaft, adapted to generate a rotation of said first shaft proportional to the azimuth angle when said brake is not engaged and to generate an electrical signal proportional to an angle which represents a differential azimuth angle whose magnitude is determined by the change in azimuth angle which occurs after said brake engages said shaft; a second servo system including a second shaft, adapted to turn said second shaft in proportion to the elevation angle of said supporting vehicle and adapted to drive said resolver means; a first segment switch positioned upon said second shaft adapted to connect the output of said resolver means to control said torquing means and to rotate said outer roll gimbal when the elevation angle of said supporting vehicle is within a predetermined high angle range, and to connect said inner roll angle signal to said outer roll torquing means when the elevation angle is not within said predetermined high angle range.

2. In combination: a stabilized reference device positioned upon a supporting vehicle for three degrees of angular freedom and including an outer roll gimbal having torquing means attached thereto; at least generating means attached to said stabilized reference device for generating signals proportional to the elevation angle, azimuth angle, and inner roll angle; multiplying and adding means connected to generate a signal proportional to the azimuth angle times the sine of the elevation angle plus the inner roll angle times the cosine of the elevation angle; first servo means adapted to generate an electrical signal proportional to an angle which represents a differential azimuth angle whose magnitude is determined by a change in azimuth angle; a second servo system adapted to generate a signal proportional to the elevation angle of said supporting vehicle; first switching means connected to said second servo to connect the output of said multiplying and adding means to control said torquing means and to rotate said outer roll gimbal when the elevation angle of said supporting vehicle is within a predetermined high angle range, and to connect said inner roll angle signal to said outer roll torquing means when the elevation angle is not within said predetermined high angle range.

3. In combination with a two-gyroscope three axes stabilized platform having at least an inner roll, elevation, and an azimuth angular pickoff, an outer roll gimbal, and a torquing means connected to rotate said outer roll gimbal, the combination of: an elevation angle servo including a first shaft, adapted to turn said shaft; a pair of segment switches connected to said shaft to turn in response to the elevation angle, one of said switches having segments thereon adapted to conduct when the elevation angle is within a predetermined high angle range, the second of said segment switches being adapted to conduct when said elevation angle is in the second and third quadrants; a resolver having its rotor connected to the shaft of said elevation angle servo and including at least two stator windings in electrical quadrature; a azimuth servo including a second shaft, adapted to turn said second shaft in response to signals from said azimuth pickoff, and further including braking means adapted to apply a braking torque to said second shaft, when actuated, said azimuth servo being adapted to generate an electrical error signal which is proportional to an azimuth angle difference between the angular value of azimuth angle which occurs when said brake is engaged and the instantaneous azimuth angle; a first relay means having two positions, the de-energized position connecting the signal from said inner roll pickoff to control said torquing means, the energized position of said relay means connecting the rotor of said resolver to control said torquing means, said relay means energizing said brake means when said relay means is in its energized position, said relay means being connected to said first mentioned segment switch to be energized when the elevation angle is within said predetermined high angle range; second relay means connected to reverse the polarity of the inner roll signal applied to said first mentioned relay means when the elevation angle is within the second and third quadrants, said second relay means being connected to be controlled by said second segment switch.

4. A device as recited in claim 3 and further comprising switch means connected to bypass said first segment switch to energize said first mentioned relay means.

5. A device as recited in claim 4 and further comprising third relay means connected to be responsive to the inner roll signal to disconnect said first mentioned segment switch when the inner roll signal reaches a predetermined amplitude.

6. A device as recited in claim 3 and further comprising means responsive to a predetermined magnitude of inner roll signal, connected to disconnect said first mentioned segment switch and to de-energize said first mentioned relay means when said inner roll signal reaches a predetermined magnitude.

7. In combination: a stabilized platform positioned upon a support for three degrees of angular freedom and including an outer roll gimbal having torquing means attached thereto; at least means attached to said stabilized platform for generating signals proportional to the elevation angle, azimuth angle, and inner roll angle; multiplying and adding means connected to generate a signal proportional to the azimuth angle times the sine of the elevation angle plus the inner roll angle times the cosine of the elevation angle; a first shaft adapted and connected to be turned in proportion to the elevation angle of said supporting vehicle, adapted and connected to drive said multiplying and adding means; a first segment switch positioned upon said first shaft, adapted to connect the output of said multiplying and adding means to control said torquing means and to rotate said outer roll gimbal when the elevation angle of said supporting vehicle is within a predetermined high angle range, and to connect said inner roll angle signal to said outer roll torquing means when the elevation angle is not within said predetermined high angle range; first servo means, including a second shaft, adapted to generate a rotation of said second shaft proportional to the azimuth angle and to generate an electrical signal proportional to an angle which represents a differential azimuth angle whose magnitude is determined by the change in azimuth angle which occurs after said first segment switch is within said predetermined high angle range.

8. In combination: a stabilized reference device positioned upon a support for three degrees of angular freedom and including an outer roll gimbal having torquing means attached thereto; at least generating means attached to said stabilized reference device for generating signals proportional to the elevation angle, azimuth angle, and inner roll angle; multiplying and adding means connected to generate a signal proportional to the azimuth angle times the sine of the elevation angle plus the inner roll angle times the cosine of the elevation angle; first servo means adapted to generate an electrical signal proportional to an angle which represents a differential azimuth angle whose magnitude is determined by a change in azimuth angle; first switching means mechanically connected to be responsive to the elevation angle of said support and electrically to connect said multiplying and adding means to control said torquing means and to rotate said outer roll gimbal when the elevation angle of said support is within a predetermined high angle range, and to connect said inner roll angle signal to said outer roll torquing means when the elevation angle is not within said predetermined high angle range.

9. In combination with a two-gyroscope three-axes stabilized platform having at least an inner roll, elevation, and an azimuth angular pickoff, an outer roll gimbal and a torquing means connected to rotate said outer roll gimbal: a pair of segment switches connected to turn in response to the elevation angle measured by said stabilized platform, one of said switches having segments thereon to conduct when the elevation angle is within a predetermined high angle range, the second of said segment switches being adapted to conduct when said elevation angle is within the second and third quadrant; a resolver having its rotor connected to be responsive to the elevation angle of said stabilized platform and including at least two stator windings in electrical quadrature; an azimuth servo including a shaft, adapted to turn said shaft in response to signals from said azimuth pickoff, and further including braking means adapted to apply a braking torque to said second shaft, when actuated, said azimuth servo being adapted to generate an electrical error signal which is proportional to an azimuth angle difference between the angular value of azimuth angle which occurs when said braking means is engaged and the instantaneous azimuth angle; first relay means having two positions, the first position connecting the signal from said inner roll pickoff to control said torquing means, the second position connecting the rotor of said resolver to control said torquing means, said relay means energizing said braking means when said relay means is in its second position, said relay means being connected to be controlled by said first mentioned segment switch to be energized when the elevation angle is within said predetermined high angle range; second relay means connected to reverse the polarity of the inner roll signal applied to said first mentioned relay means when the elevation angle is within the second and third quadrants, said second relay means being connected to be controlled by said second segment switch.

10. A device as recited in claim 9 and further comprising switch means connected to bypass said first segment switch to energize said first mentioned relay means.

11. A device as recited in claim 10 and further comprising third relay means connected to be responsive to the inner roll signal to disconnect said first mentioned segment switch when the inner roll signal reaches a predetermined amplitude.

12. A device as recited in claim 9 and further comprising means responsive to a predetermined magnitude of inner roll signal, connected to disconnect said first mentioned segment switch and to de-energize said first mentioned relay means when said inner roll signal reaches a predetermined magnitude.

13. A stabilized reference system comprising in combination: a stabilized three-axes reference device containing an outer roll gimbal, an inner roll axis-containing means, and an azimuth angle indicating means; azimuth angle, inner roll angle and elevation angle measuring devices, connected to be responsive to the position of said three-axes reference device; a supporting vehicle for said three-axes reference device; torquing means between said vehicle and said outer roll gimbal; means for generating a signal proportional to the azimuth angle times the sine of the elevation angle plus the inner roll angle times the cosine of the elevation angle; and high angle switching means responsive to the elevation angle of said supporting vehicle, adapted to connect the output signal from said generating means to said torquing means when said elevation angle reaches a predetermined high-angle range.

14. A stabilized reference device comprising in combination: a stabilized three-axes reference device having an outer roll gimbal, an inner roll axis-containing means, and an azimuth angle indicating means; azimuth angle, inner roll angle, and elevation angle measuring devices, connected to be responsive to the position of said stabilized three-axes reference device; and means for generating a signal proportioned to the azimuth angle multiplied by a function of the elevation angle plus the inner roll angle multiplied by a function of the elevation angle.

15. In a stabilized reference system having a stabilized three-axes reference device having an outer roll gimbal, an inner roll axis-containing means, and an azimuth angle indicating means; and azimuth angle, inner roll angle, and elevation angle measuring devices, connected to be responsive to the position of said stabilized three-axes reference device; the improvement comprising: means for generating a signal proportional to the azimuth angle multiplied by a function of the elevation angle.

16. In a stabilized reference system having a stabilized three-axes reference device having an outer roll gimbal, an inner roll axis-containing means, and an azimuth angle indicating means; and azimuth angle, inner roll angle, and elevation angle measuring devices, connected to be responsive to the position of said stabilized three-axes reference device; the improvement comprising: means for generating a signal proportional to the inner roll angle multiplied by a function of the elevation angle.

17. In a stabilized reference system having a stabilized three-axes reference device having an outer roll gimbal, an inner roll axis-containing means, and an azimuth angle indicating means; and azimuth angle, inner roll angle, and elevation angle measuring devices, connected to be responsive to the position of said stabilized three-axes reference device; the improvement comprising: means for generating a signal proportional to the azimuth angle multiplied by the sine of the elevation angle.

18. In a stabilized reference system having a stabilized three-axes reference device having an outer roll gimbal, an inner roll axis-containing means, and an azimuth angle indicating means; and azimuth angle, inner roll angle, and elevation angle measuring devices, connected to be responsive to the position of said stabilized three-axes reference device; the improvement comprising: means for generating a signal proportional to the inner roll angle multiplied by the cosine of the elevation angle.

19. In a three-axes stabilized reference device having an outer roll gimbal, a first gimbal mounted for rotation relative to said outer roll gimbal, an inner roll axis-containing means mounted in said first gimbal, and an azimuth angle indicating means, an elevation angle measuring device connected to be responsive to the degree of rotation of said outer roll gimbal relative to said first gimbal, an inner roll gimbal measuring device connected to be responsive to the position of said inner roll axis-containing means, and an azimuth angle measuring device connected to be responsive to the position of said azimuth angle indicating means, the improvement comprising means for generating a signal proportional to the azimuth angle times the sine of the elevational angle plus the inner roll angle times the cosine of the elevational angle.

References Cited in the file of this patent

UNITED STATES PATENTS

| | | |
|---|---|---|
| 2,729,108 | Vacquier et al. | Jan. 3, 1956 |
| 2,802,364 | Gievers | Aug. 13, 1957 |

FOREIGN PATENTS

| | | |
|---|---|---|
| 1,172,113 | France | Oct. 13, 1958 |